United States Patent [19]

Foley et al.

[11] 4,036,806

[45] July 19, 1977

[54] MOLDING COMPOUNDS

[75] Inventors: Kevin M. Foley, Toledo; Reuben H. Bell, Cincinnati; Frank P. McCombs, Granville, all of Ohio

[73] Assignee: Owens-Corning Fiberglas Corporation, Toledo, Ohio

[21] Appl. No.: 620,524

[22] Filed: Oct. 8, 1975

[51] Int. Cl.$^2$ ................................................ C08K 3/30
[52] U.S. Cl. .................................. 260/37 N; 106/90; 260/29.2 N; 260/9
[58] Field of Search ..................... 106/90; 260/29.2 E, 260/29.2 N, 37 N, 40 R

[56] References Cited

U.S. PATENT DOCUMENTS

| 2,664,405 | 12/1953 | Anderson et al. | 260/29.2 E X |
|---|---|---|---|
| 3,240,736 | 3/1966 | Berkwith | 106/90 X |
| 3,419,517 | 12/1963 | Hedrick et al. | 260/37 N |
| 3,437,619 | 4/1969 | Nutt | 260/40 R X |
| 3,733,283 | 5/1973 | Duggins | 260/37 N X |
| 3,933,731 | 1/1976 | Machi et al. | 260/37 N X |

OTHER PUBLICATIONS

A. & E. Rose, *Condensed Chemical Dictionary*, (5th Ed.), 1956, p. 543.

*Primary Examiner*—Sandra M. Person
*Attorney, Agent, or Firm*—John W. Overman; Patrick P. Pacella

[57] ABSTRACT

We have developed molding compounds from cement in combination with a nylon or polyester resin. We form the resin in the presence of the cement. We can use these molding compounds to form molded articles which have good fire resistance.

13 Claims, No Drawings

MOLDING COMPOUNDS

This invention relates to molding compounds of cement in combination with nylon or polyester.

The production of molding compounds from phenol-formaldehyde condensates is an old art which has enjoyed many fruitful years in the plastics industry. Concrete and cement also have long been satisfactory materials for the construction of roads, buildings, floors, sidewalks, and the like. More recent developments include molding compounds of phenolic resins containing major amounts of cement. Industry often forms the resins in situ during the curing of the cement; or they first can form the resin and then mix it with the cement. The industry has employed both hydrated or hydraulic cement in these hybrid forms.

We now have discovered molding compounds of cement in combination with nylon or polyester.

The nylons are polymer chains containing the recurring amide group — CONH — as an integral part of the main chain. Often a diamine and a dibasic acid form the nylon. For example, nylon 66 is the condensation of hexamethylenediamine and adipic acid. Nylon 6 is the polycondensation of caprolactam. We have found the polycondensation of B-alanine (3-aminopropanoic acid) to be particularly useful. Its monomer has the formula $NH_2CH_2CH_2COOH$ and a molecular weight of 89.09.

The preparation of polyesters of glycols and dibasic acids by ester exchange and condensation also is old in the art. U.S. Pat. Nos. 2,465,319; 2,727,881; and 3,488,382 and many others describe such processes in great detail. Poly (ethylene terephthalate) and poly (propyleneterephthalate) are typical of the polyesters industry produces. These polyesters have found widespread use in the manufacture of films, fibers, and molding compounds.

In particular, we have found the condensation of dipropylene glycol and adipic acid to be very useful in our invention.

The cements we employ are inorganic cements as hydraulic cements. Hydraulic cements are powder mixtures made from silica, alumina, lime, iron oxide, and magnesia, which harden when mixed with water. They include Portland, calcium-aluminate, magnesia, natural, masonry, pozzolan, and slag cements.

We also can employ gypsum with the cements.

To produce the hydrated cement, we can agitate ground cement clinker in a water slurry for a period of time. We then dry the hydrate.

The produce the molding compounds of our invention, we mix the monomers and cement with water. We first mix the ingredients in any type of container and then pour them into a mold before they cure. Or we can mix the ingredients directly in the mold. The nylon or polyester resin then forms in situ during the curing of the cement. This in-situ reaction allows for better interaction between the monomers and the cement because all these materials are soluble in water. Forming the nylon or polyester resin first and then mixing it with the cement and water would provide very poor interaction between the organic materials and cement because the resins, once they form, generally are insoluble in water. The insoluble resins would not easily blend with the cement and water. Whereas the soluble monomers use to form the nylons and polyesters blend very well with the cement and water.

The resin and cement have a weight ratio of resin to cement ranging from 1:9 to 9:1 based on the dry weight of cement and the weight of resin solids.

The amount of water present need only be sufficient to cure the cement. It may be necessary to add additional water or remove some of the water of reaction.

The molding compounds of our invention can be incorporated into either a sheet molding compound (SMC) or a bulk molding compound (BMC). We do this by the addition of glass fibers in an amount greater than 0 up to about 60 percent by weight of the resulting sheet or bulk molding compound.

In both SMC and BMC we prefer that a mold release agent be added in an amount up to about 5 percent by weight of the sheet or bulk molding compound. A particularly suitable mold release agent is zinc stearate.

In addition, in our sheet or bulk molding compounds we can also include a silane coupling agent or a mixture of silane coupling agents in a total amount of from about 0.01 to about 5 percent by weight of the compound to increase the strength properties of the resulting moldings. Particularly suitable silane coupling agents are A-1100 and Tetraethyl Orthosilicate, commercially available from Union Carbide Corporation. A-1100 is gamma-aminopropyltriethoxysilane and Tetraethyl Orthosilicate is tetraethoxysilane.

We cure the molded articles with or without glass fibers in a hot air oven by conventional means. Or, if the systems cure themselves, no heating is necessary.

These molding compounds have good flame resistance. We can form shingles, coatings, and appliances such as bathtubs from them.

The following examples further illustrate our invention.

EXAMPLE I

This example demonstrates a molding compound of nylon and Portland cement. We thoroughly mixed 44.6 grams (0.5 mole) of B-alanine with 131.0 grams of Portland cement and 40.0 grams of water in disposable plastic beakers. We molded an article from the mixture in the beaker, removed the article, and placed it in a dry hot air oven at 105° C for 16 hours. A hard product resulted.

We held the molded article in a burner flame. When we removed it from the flame, it would not support combustion.

EXAMPLE II

We repeated the procedure of Example I, except that we employed the following mix:

The results were the same as we described in Example I.

EXAMPLE III

This example demonstrates a molding compound of a polyester and Portland cement. We mixed 73.0 grams of adipic acid, 210 grams of Portland cement, and 67.1 grams of dipropylene glycol thoroughly together in a disposable plastic beaker. We then added 75.0 grams of water to this mixture. An exotherm to 72° C occurred and the material set up to a solid. It was self-curing. We removed the solid product from the beaker and held it in a burner flame. When we removed the article from the flame, it would not support combustion.

EXAMPLE IV

We repeated the procedure of Example III, except that we employed the following mix:

We added no water. The sample did not cure at room temperature, but it cured on a hot plate to give a solid in 10 minutes. Left to itself, a portion of this sample also cured to a solid in two days at room temperature.

The results for both samples were the same as we described in Example III.

The examples demonstrate that we can use the molding compounds of our invention to form molded articles which have good fire resistance. The same cannot be said for conventional nylons and polyesters.

We intend to include modifications and variations within the scope and spirit of our invention.

We claim:

1. A molding composition comprising a mixture of a nylon resin and at least one organic cement, wherein the resin is formed in the presence of the cement and wherein the resin and cement have a weight ratio of resin to cement ranging from 1:9 to 9:1 bases on the dry weight of cement and the weight of the resin solids wherein the cement is hydrated or hydraulic cement.

2. A composition according to claim 1 including sufficient water to cure the cement present.

3. A composition according to claim 1 wherein the resin is the polycondensation product of B-alanine.

4. A composition according to claim 1 wherein the cement is Portland cement.

5. A composition according to claim 1 including gypsum.

6. A composition according to claim 1 including starch.

7. A composition according to claim 1 including glass fibers.

8. A molded article formed by curing the composition of claim 1.

9. A molded article formed by curing the composition of claim 7.

10. A sheet molding compound comprising the uncured, moldable composition of claim 1, glass fibers, a mold release agent, and at least one silane coupling agent.

11. A bulk molding compound comprising the uncured, moldable composition of claim 1, glass fibers, a mold release agent, and at least one silane coupling agent.

12. A molded article formed by curing the composition of claim 10.

13. A molded article formed by curing the composition of claim 11.

* * * * *